June 24, 1924.
O. ANDREWS
1,498,603
RESILIENT WHEEL
Filed Jan. 3, 1923
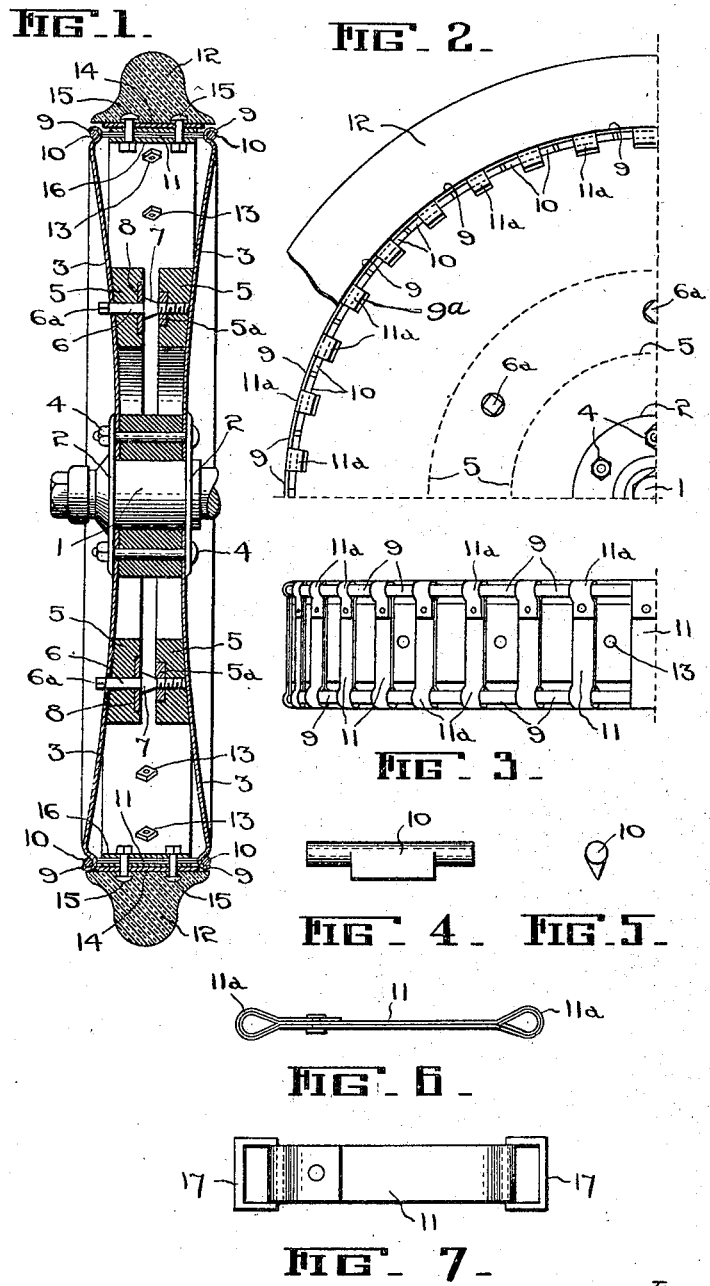
Inventor:
O. Andrews
by Langner, Parry, Card + Langner
Attys.

Patented June 24, 1924.

1,498,603

UNITED STATES PATENT OFFICE.

OSCAR ANDREWS, OF PALMERSTON NORTH, NEW ZEALAND.

RESILIENT WHEEL.

Application filed January 3, 1923. Serial No. 610,492.

*To all whom it may concern:*

Be it known that I, OSCAR ANDREWS, a citizen of the Dominion of New Zealand, residing at 67 Fitzherbert Street, Palmerston North, in the Provincial District of Wellington, New Zealand, have invented an Improved Resilient Wheel, of which the following is a specification.

This invention relates to vehicle wheels, and more especially to wheels used on motor cars and like vehicles, provided with rubber tires.

The object of the invention is to provide an improved construction of resilient wheel, on which solid tires can be used instead of pneumatic tires in order that puncture troubles will be eliminated, while a degree of resiliency at least equal to that present when a pneumatic tire is used is obtained.

The improved wheel comprises circular spring members secured side by side on a hub so that a space provided between said members surrounds the hub.

The outer edges of the spring members are connected by flexible cross straps which carry a solid rubber tire the latter being secured to a band located inside the cross straps and also if desired to one or more bands surrounding or outside the latter.

The centre portions of the circular spring members are attached to the hub and are non-expanding, while the outer portions of said circular spring members are adapted to be forced from each other under the action of expanding means acting in rings placed between the spring members in order that tension may be placed on the straps connecting their outer edges.

Under the weight of a load and as the result of road shocks the outer portions of the spring members spring or move towards and from each other, thereby at times easing and at times increasing the tension on the straps which carry the tire whereby road shocks are largely absorbed or minimised by the tire and wheel, to a degree at least equal to that obtained by a pneumatic tire.

A convenient form of the invention will be described in conjunction with the accompanying drawing wherein:—

Figure 1 is a vertical section of the improved wheel

Figure 2 is a part side view of same.

Figure 3 is a part plan view with the tire removed.

Figure 4 is a plan view, and

Figure 5 is an end view of one of the pins for securing the flexible straps.

Figure 6 is an elevation of one of the latter and

Figure 7 is a plan of a modified form of strap.

In the drawing, 1 represents a hub of conventional design, having secured thereon between the flanges 2, dished spring steel discs 3, placed so that their hollow or concave sides face outwards or away from each other.

The discs 3 are secured together by any desired number of bolts 4 which pass through the flanges 2, the discs 3 and the hub 1.

Outer bolts 6 which screw in nuts $5^a$ or the like recessed and immovably held in the inner surface of one of separate rings 5 surrounding the hub 1 between the discs 3, are provided with shoulders 7 which work against the inner surface of the other of the rings 5. Preferably the latter has recessed therein bearing plates 8 through which said bolts 6 pass, the shoulders 7 on the latter bearing against the plates 8.

The bolts 6 pass through one of the discs 3 and are squared as at $6^a$ or otherwise formed to enable them to be gripped and turned, for the purpose either of forcing rings 5 and the outer portions of the discs 3 apart, or for allowing said rings and outer portions to contract and move towards each other.

The outer edges of the discs 3 have formed thereon opposed hook shaped portions 9.

These hook shaped portions 9 are equally spaced around the edges of the discs 3 and are provided for the purpose of accommodating pins 10 passed through, or connected to the ends of, flexible straps 11, which extend from the outer edge of one disc 3 to the outer edge of the other disc 3 at the desired intervals.

The main or centre portion of each pin 10 is half round, and half tapered to one side, while the ends of each pin are rounded (Figs. 4 and 5).

The straps 11 are formed from light spring steel or other suitable flexible material of the necessary strength, wound or doubled together a suitable number of times and having its ends secured to provide a formation with looped ends 11a (see Figure 6).

A pin 10 is inserted in each looped end 11a of a strap 11 with the half round side outwards, the round pin ends being engaged in the hook shaped portions 9 so that the strap 11 is held crossways between the outer edges of the discs 3.

Straps 11 are secured in this way at the required intervals around the edges of the discs 3, there being preferably a strap 11 accommodated in each directly opposite pair of recesses 9a between the hook shaped portions 9.

To provide for the securing of the tire 12 to the wheel, a band 16 of rubber, canvas or the like is placed inside the flexible straps 11, and is secured by rivets, bolts or the like 13 passing between the said straps 11 to one or more bands 14 of rubber or the like surrounding or on the outside of the straps 11, the first of the bands 14 on the outside of the straps 11 extending the full width between the outer edges of the discs 3.

The tire 12 which is solid, and preferably has a shape in cross section, substantially as shown in Fig. 1, is secured by bolts 15 having oval heads embedded in the tire, said bolts 15 passing between the straps 11 and through the bands 14 and 16 and being provided with nuts on their inner ends.

In a modification the straps 11 (Figure 7) can be provided with links 17 at the ends, said links being adapted to be passed over opposite hook shaped portions 9, in which case the straps will not enter the recesses between said hook shaped portions but will extend from a hook 9 on one disc 3 across to the directly opposite hook 9 on the other disc 3.

If desired the tire 12 can be formed of sections placed circumferentially around the wheel and also if found necessary or desirable the band 14 next the tire can be of metal permanently secured to the tire, and also in sections, to suit the sections of tire.

A wheel constructed as above described provides as great a degree of resiliency or ease in riding as is obtained with a pneumatic tire, while tire troubles due to punctures are completely eliminated.

The bolts 6 can be adjusted to spread or regulate the spacing apart of the outer portions of the discs 3, to enable the required tension to be placed on the straps 11 and the desired degree of resiliency to be obtained. Road shocks are absorbed or minimised by the spring of the discs 3, the flexible straps 11 and the tire 12.

What I do claim and desire to obtain by Letters Patent of the United States of America is:—

1. A vehicle wheel comprising a hub, circular spring members secured side by side on the hub, flexible straps connecting the outer edges of said spring members, and a tire carried by said flexible straps, wherein the central portions of said circular spring members are non-expanding, the outer portions of said spring members being capable of movement towards and away from each other.

2. A vehicle wheel comprising a hub, circular spring members secured side by side on the hub, flexible straps connecting the outer edges of said spring members, and a tire carried by said flexible straps, separate rings surrounding the hub between said members, and bolts, for forcing the spring members apart, the bolts being positioned in the rings.

3. A vehicle wheel comprising a hub, circular spring members secured side by side on the hub, flexible straps connecting the outer edges of said spring members, and a tire carried by said flexible straps wherein the central portions of said circular spring members are non-expanding, the outer portions of said spring members being capable of movement towards and away from each other, separate rings surrounding the hub between said members, and bolts, for forcing the spring members apart, the bolts being positioned in the rings.

4. A vehicle wheel comprising a hub, circular spring members secured side by side on the hub, flexible straps connecting the outer edges of said spring members, and a tire carried by said flexible straps, wherein directly opposite hook-shaped portions are provided around the outer edges of the circular spring members, for enabling the flexible straps to be secured between said outer edges.

5. A vehicle wheel comprising a hub, circular spring members secured side by side on the hub, flexible straps connecting the outer edges of said spring members, and a tire carried by said flexible straps, wherein directly opposite hook shaped portions are provided around the outer edges of the circular spring members, for enabling the flexible straps to be secured between said outer edges, wherein the flexible straps have looped ends, connecting pins received in said ends, said pins having rounded ends, and half round and half tapered center portions.

6. In a vehicle wheel of the kind described, a hub, circular spring members on the hub, oppositely positioned hook shaped portions on the edges of the spring members, and flexible tire carrying straps provided at their ends with loops to be connected to the directly opposite hook shaped portions.

7. In a vehicle wheel, circular spring members secured side by side on a hub, a pair of rings placed between the members, a plurality of bolts, each bolt passing through one of said members and screwing into one ring of the pair, each bolt being provided with a shoulder which bears against the other of the pair of said rings, and means whereby to turn each bolt.

In testimony whereof I have signed my name to this specification.

OSCAR ANDREWS.